E. T. KELLER.
ACID COLLECTING APPARATUS.
APPLICATION FILED JAN. 10, 1917.

1,247,280.

Patented Nov. 20, 1917.
3 SHEETS—SHEET 1.

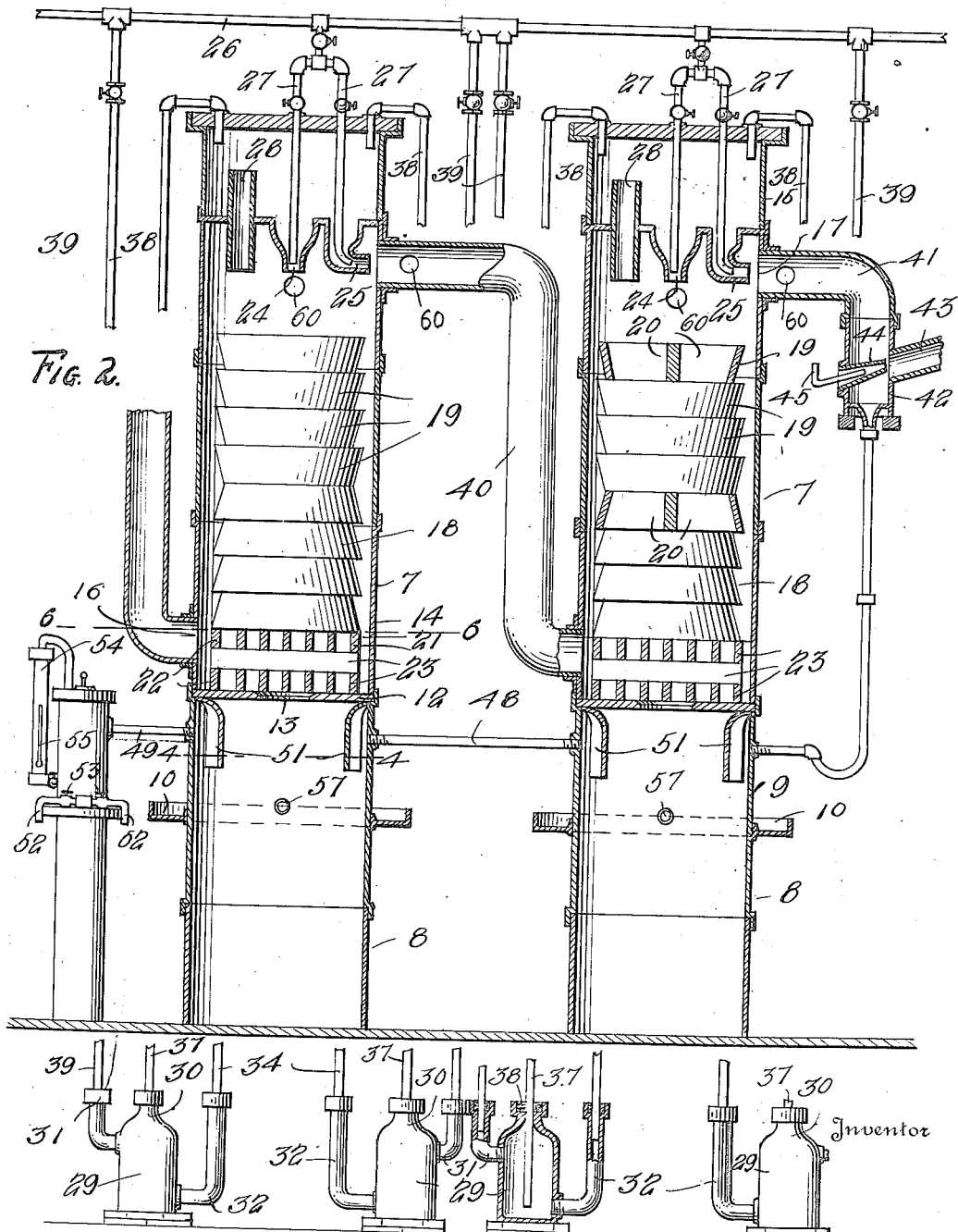

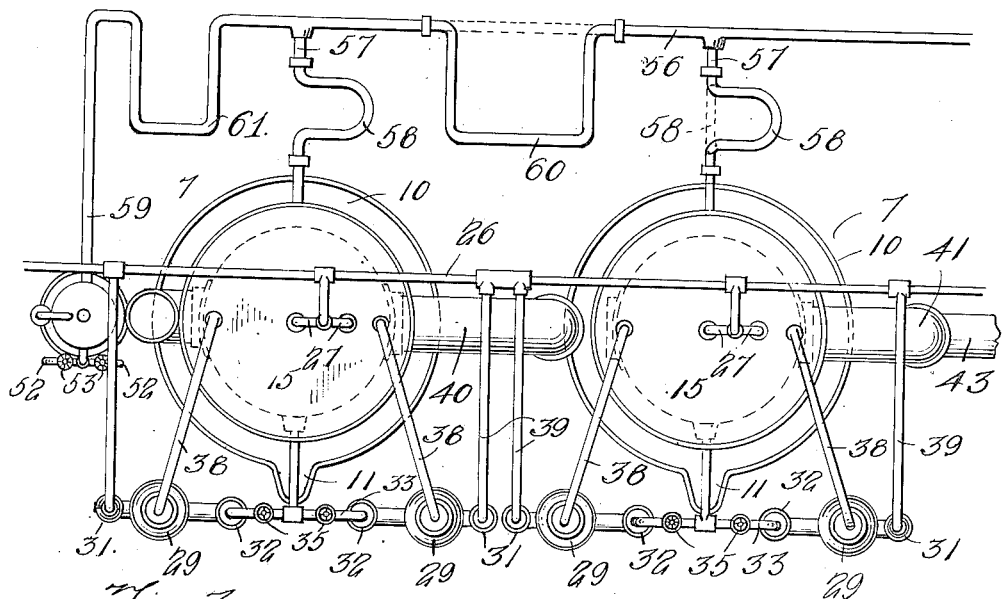
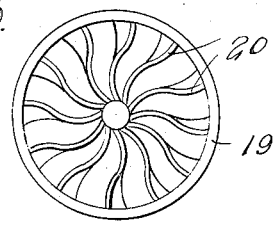
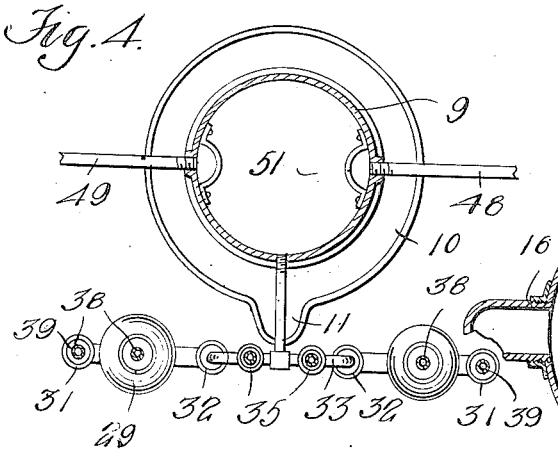
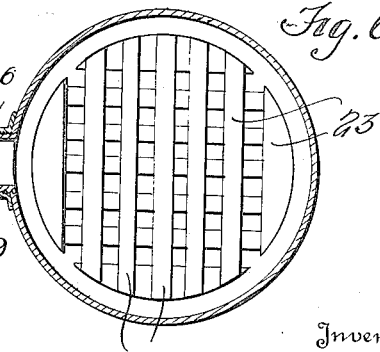

UNITED STATES PATENT OFFICE.

EMORY T. KELLER, OF CITY POINT, VIRGINIA.

ACID-COLLECTING APPARATUS.

1,247,280.                    Specification of Letters Patent.         Patented Nov. 20, 1917.

Application filed January 10, 1917. Serial No. 141,707.

*To all whom it may concern:*

Be it known that I, EMORY T. KELLER, a citizen of the United States, residing at City Point, in the county of Prince George and State of Virginia, have invented certain new and useful Improvements in Acid-Collecting Apparatus, of which the following is a specification.

The present invention relates to means for collecting acid from fumes, as for example, nitric acid, and the primary object is to provide a novel structure of an effective character that is substantially automatic in operation, and is relatively simple in structure, so that it can be easily built, installed and repaired.

In the accompanying drawings:—

Fig. 2 is a vertical sectional view therethrough,

Fig. 3 is a plan view,

Fig. 4 is a horizontal sectional view taken substantially on the line 4—4 of Fig. 2, Fig. 5 is a plan view of one of the baffles, Fig. 6 is a horizontal sectional view substantially on the line 6—6 of Fig. 2.

Similar reference numerals designate corresponding parts in all the figures of the drawings.

Figure 1:
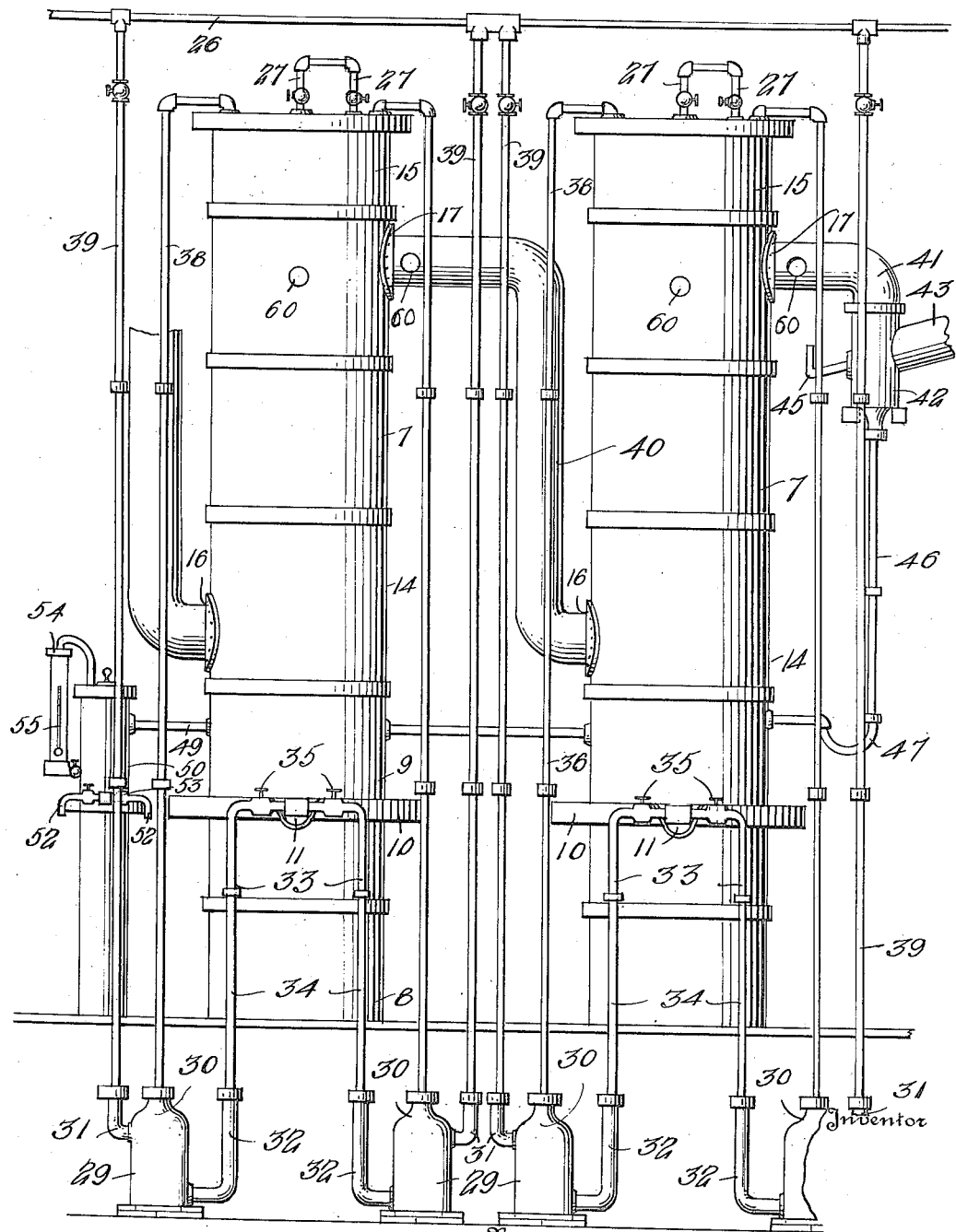
Figure 1 is a side elevation of one embodiment of the apparatus.

In the embodiment illustrated, a plurality of upright towers 7 are employed, two being shown, though a greater or less number may be utilized, depending on the size and character of the plant. As these towers are substantially the same in structure, a description of one will be sufficient for all.

Each tower comprises a suitable base 8 on which is mounted a liquid collecting reservoir 9, the same being preferably surrounded by a drop receiving gutter 10 having a discharge spout 11. The top of the collecting reservoir is in the form of a plate 12, having a central opening 13 therethrough, affording communication between the body of the tower and the reservoir 9. The said body of the tower consists of a cylindrical wall 14, which may be built up of sections, and mounted on said body is a distributing reservoir 15.

The fumes from which the acid is collected, are introduced into the lower portion of each tower through an intake opening 16, and said fumes escape through an outlet opening 17 located in the upper portion of the tower and preferably in the opposite side to the intake 16. Interposed between the intake 16 and outlet 17 are fume deflecting baffles 18. Each of these baffles preferably consists of a cylindrical peripheral ring 19 having its exterior face tapered and its inner face connected to the outer ends of a series of curved radially disposed deflecting blades 20 that are spirally formed, or in other words, set at an inclination. These baffles are disposed in series, as shown, and one series is located in reversed relation to another, so that the inclination of the blades of each series is reversed to that of the other. As many of these sets or series of baffles may be employed as desired, and they are supported on a lower brick-work 21. This brick-work as will be clear by reference to Figs. 2 and 6, consists of layers of spaced bars or grates 23, the bricks of one layer being preferably set at right angles to the bricks of the layer beneath.

The distributing reservoir is provided with one or more downwardly projecting liquid delivery nozzles 24 designed to discharge the liquid from said reservoir downwardly through the tower so that it will flow over the baffles and finally find its way through the opening 13 into the collecting reservoir 9. These nozzles may be centrally located, as shown, or otherwise arranged as desired. Each distributing reservoir 15 is furthermore provided with a nozzle 25 that discharges liquid into the escape opening 17 of the tower. To effect a spraying action from these nozzles, air or other suitable fluid under pressure is supplied from any suitable source through a pipe 26, and this pipe has branches 27 that terminate in the nozzles 24 and 25. It will be understood that in order to illustrate these features with clearness, proper proportions of the parts have not been attempted, and the showing in this respect may be considered as diagrammatic in its character. Each distributing reservoir furthermore preferably has an overflow pipe 28 that discharges into the upper portion of the tower.

In order to secure a continuous circulation of the liquid there is connected to the lower portion of each collecting reservoir 9, one or more liquid elevators, two for each tower being shown in the present arrangement. Each of these elevators consists of a chamber member 29 having a central neck 30, an offset upstanding neck 31 connected to its upper portion, and an offset upstanding neck 32 connected to its lower portion. A supply pipe 33, communicating with the lower portion of the receiving reservoir 9 has a detachable section 34 slidably mounted in the neck 32, the same being suitably packed to prevent leakage at the joint between said neck 32 and the section 34. This pipe is preferably controlled by a suitable valve 35. A delivery pipe 36 has a detachable section 37 removably fitted in the central neck 30, and extending to the lower portion thereof, the joint between said neck and pipe being also preferably packed, as shown at 38 in Fig. 2. The pipe 36 leads to and discharges into the upper distributing reservoir 15. Air or other fluid under pressure is conducted from the line 26 by a branch 39 that has its lower end removably inserted in the neck 31. It will thus be evident that an elevator of the pulsometer type is provided, which will withdraw the liquid collected in the reservoir 9 and elevate it into the reservoir 15, and it will also be seen that this liquid so collected will be sprayed downwardly through the tower and outwardly through the discharge opening 17. The outlet 17 of one tower is connected to the intake 16 of the adjacent tower by a suitable conduit 40, and therefore the liquid and air discharged by the nozzle 25 will act as ejecting means for the fumes, producing a suitable current to cause said fumes to pass through the apparatus and the liquid will be directed by the conduit into the next adjacent tower.

From the final tower, the fumes pass through the outlet 17 into a conduit 41 having a depending portion 42 provided with an offset exhaust pipe 43 that leads to any desired point of discharge. Arranged in the depending portion is an ejector nozzle 44 delivering into the discharge pipe 43, and having a steam pipe 45 delivering thereinto, a liquid conducting pipe 46 leading from the lower end of the portion 42 into the collecting reservoir 9 of the adjacent tower, there preferably being a trap 47 formed in said pipe. An overflow pipe 48 connects one of the collecting reservoirs 9 with the next adjacent reservoir and an outflow pipe 49 leads from the first tower to an acid collecting pot 50. The ends of the various pipes are preferably covered by sealing hoods 51 located in the different reservoirs. The said collecting pot 50 is provided with suitable discharging means 52 controlled by valves 53 and said pot furthermore has a suitable glass gage 54 connected thereto which may be of suitable size to receive a hydrometer 55.

As shown more particularly in Fig. 3 there is also provided a system for by-passing the liquid around any of the towers in case the same becomes inactive for any reason. This system consists of a pipe 56 having branches 57 leading from the different collecting reservoirs 9. In said branches are liquid controlling devices shown in the form of goose necks 58 that can be turned either to a horizontal or vertical position. The pipe 56 also is connected to the acid collecting pot 50, as shown at 59, and said pipe is provided between the towers with a goose neck 60 that can be moved to a horizontal or vertical position. Another goose neck 61 is disposed in the pipe 56 between the branch 57 connecting the first tower and the connection 50 with the acid collecting pot.

The operation of the apparatus may be briefly outlined as follows: A suitable liquid having first been introduced into the second or last tower, air is turned into the pulsometers and this liquid will consequently be circulated from the lower collecting reservoir through the pulsometers to the upper distributing reservoir, and thence downwardly through the tower, a portion being discharged into the conduit 41, and finding its way back through the pipe 46 into the collecting reservoir. If now the acid fumes are passed through the apparatus, the liquid thus discharging will absorb the acid and consequently said liquid will increase. It thereupon overflows through the pipe 48 into the collecting reservoir of the first tower, and will in like manner be circulated through this tower. As the volume increases it will overflow through the pipe 49 into the collecting pot, from which it may be removed and treated as desired. If one of the towers become inoperative, the liquid collecting means thereof may be readily cut out of the system. Under ordinary conditions, the goose necks 58 are disposed in vertical position, and consequently the flow of the liquid through the pipe 56 is prevented. If, for example, the first tower becomes inactive, the goose neck 58 connected therewith is left in vertical position, and the goose neck 58 connected to the next tower is then placed in horizontal position. The goose necks 60 and 61 are also located in horizontal position. The liquid will consequently flow around the first tower directly to the acid collecting pot. In case a greater number of towers is employed any intermediate tower can be in like manner cut out. In order that the passage of the fumes and the action of the liquid may be observed, glass covered view openings or "peep-holes" 60ª are located in the upper portions of the towers and in the conduits 40 and 41.

From the foregoing, it is thought that the construction, operation and many advantages of the herein described invention will be apparent to those skilled in the art, without further description, and it will be understood that various changes in the size, shape, proportion and minor details of construction, may be resorted to without departing from the spirit or sacrificing any of the advantages of the invention.

Having thus fully described my invention, what I claim as new, and desire to secure by Letters Patent, is;—

1. In fume absorbing apparatus, the combination with an upright tower, of means for passing fumes upwardly therethrough, means for spraying liquid downwardly through the tower, means for collecting said liquid in the lower portion of the tower, means for elevating the liquid from the collecting means to the discharging means, and a plurality of baffles in the tower having spiral fume-deflecting blades.

2. In fume absorbing apparatus, the combination with an upstanding tower having an upper delivery reservoir and a lower collecting reservoir, of a pump for elevating liquid from the lower to the upper reservoir, means for spraying the liquid from the upper reservoir downwardly through the tower toward the lower reservoir, means for introducing acid fumes into the lower portion of the tower and effecting the discharge from the upper portion thereof, and sets of reversely disposed baffles in the tower having radial spiral fume deflecting blades.

3. In fume absorbing apparatus, the combination with a tower having a lower fume intake and an upper fume outlet of means for delivering an acid collecting liquid downwardly through the tower and outwardly through the fume outlet.

4. In fume absorbing apparatus, the combination with a tower having a lower fume intake and an upper fume outlet, of a collecting reservoir for receiving the liquid from the lower end of the tower, means for delivering an acid collecting liquid downwardly through the tower and outwardly through the fume outlet, and means for directing the liquid so delivered into the collecting reservoir.

5. In fume absorbing apparatus, the combination with a tower having a lower fume intake and an upper fume outlet, of a collecting reservoir for receiving the liquid from the lower end of the tower, means for delivering an acid collecting liquid downwardly through the tower and outwardly through the fume outlet, means for directing the liquid so delivered into the collecting reservoir, and means for directing the liquid from the reservoir to the delivery means.

6. In fume absorbing apparatus, the combination with a tower having a lower fume intake and an upper fume outlet, of a collecting reservoir connected to the lower portion of the tower, an upper delivery reservoir, a pump for elevating liquid from the lower reservoir to the upper reservoir, and discharge nozzles connected to the upper reservoir and delivering respectively downwardly into the tower and into the fume outlet, said fume outlet having a liquid conducting connection with the lower collecting reservoir.

7. In fume absorbing apparatus, the combination with a tower having a lower fume intake and an upper fume outlet, of means for delivering a fume collecting liquid downwardly through the tower and outwardly through the fume outlet, and means for collecting such liquid.

8. In fume absorbing apparatus, the combination with a plurality of upright towers, of a liquid collecting reservoir for each tower, a liquid distributing reservoir for each tower, means for elevating the liquid from the receiving reservoir of each tower to the distributing reservoir of such tower, means for introducing fumes into the lower portion of each tower and discharging the same from the upper portion thereof, a connection between the fume discharging means of one tower and the intake means of the next, and means for directing liquid from the distributing reservoir of each tower downwardly through such tower and also into the fume discharging means.

9. In fume absorbing apparatus, the combination with a plurality of towers, means for passing fumes therethrough and from one to the other, means for discharging liquid into the various towers to absorb the fumes therein, collecting means for such liquid connected with each tower, a liquid conducting means connecting the liquid collecting means, and means for passing the liquid from the collecting means of one tower around the liquid collecting means of another to which it is connected.

10. In fume absorbing apparatus, the combination with a plurality of towers, means for passing fumes therethrough and from one to the other, means for discharging liquid into the various towers, a liquid collecting reservoir for each tower, an overflow from one reservoir delivering to the other reservoir, an acid collecting pot, an overflow connecting one of the collecting reservoirs and the pot, a by-pass pipe connected to the various collecting reservoirs, and to the collecting pot, and means for controlling the various connections to cut out any collecting reservoir while preserving communication between the other reservoirs and the collecting pot.

11. In fume absorbing apparatus, the combination with a plurality of upright towers, of means for introducing fumes into the lower portion of each tower and discharging the same from the upper portion thereof, a conduit connecting the discharge means of one tower with the intake of the next tower, a plurality of reversely arranged baffles located in the towers and having spiral radially disposed fume deflecting blades, a distributing reservoir for each tower, a collecting reservoir for each tower, discharge nozzles for directing liquid from the distributing reservoirs downwardly through the respective towers and into the conduits, means for directing fluid under pressure through said nozzles, means for elevating liquid from the collecting reservoirs to the distributing reservoirs, an overflow connecting one collecting reservoir with the next, an acid collecting pot connected to one of the towers, a by-pass pipe connected to the different collecting reservoirs and to the collecting pot, and means for controlling the passage of liquid through said by-pass.

12. In fume absorbing apparatus, the combination with an upright tower, of means for passing fumes upwardly therethrough, means for spraying liquid downwardly through the tower, a lower collecting reservoir, a pump comprising a chamber having a plurality of nipples, and gaseous liquid and fluid supply and delivery tubes slidably mounted in the nipples and detachably connected respectively with the collecting reservoir, and spraying means for causing a repeated circulation of the liquid through the towers.

In testimony whereof, I affix my signature in the presence of two witnesses.

EMORY T. KELLER.

Witnesses:
J. C. THOMASON,
C. E. RICHARDSON.